(12) United States Patent
Helm

(10) Patent No.: US 10,528,957 B2
(45) Date of Patent: Jan. 7, 2020

(54) SYSTEMS AND METHODS FOR PROVIDING BROADCAST DATA ANALYSIS

(71) Applicant: Toyota Motor Engineering & Manufacturing North America, Inc., Erlanger, KY (US)

(72) Inventor: Sean L Helm, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 997 days.

(21) Appl. No.: 14/525,852

(22) Filed: Oct. 28, 2014

(65) Prior Publication Data

US 2016/0117690 A1    Apr. 28, 2016

(51) Int. Cl.
*G06Q 30/02* (2012.01)

(52) U.S. Cl.
CPC ................................ *G06Q 30/0201* (2013.01)

(58) Field of Classification Search
CPC .... G06Q 30/00; G06Q 30/02; G06Q 30/0272; G06Q 50/01; G06Q 30/0277; G06Q 30/0201; G06Q 30/0251; G06Q 30/0261; G06Q 30/0267; G06Q 30/0271; G06Q 30/0273; G06Q 30/0276; G06Q 10/067; G06Q 10/10; G06Q 20/123; G06Q 30/0203; G06Q 30/0217; G06Q 30/0231; G06Q 30/0244; G06Q 30/0255; G06Q 30/0263; G06Q 30/0264; G06Q 30/0269; G06Q 30/0275; G06Q 30/0601; G06Q 30/0631; G06Q 30/0641; G06Q 30/0645; G06Q 30/08; G06Q 40/04; G06Q 40/12; G06Q 50/30

USPC .................... 705/7.29, 7.31, 7.32, 7.33, 7.34
See application file for complete search history.

(56) References Cited

U.S. PATENT DOCUMENTS

| | | | |
|---|---|---|---|
| 6,996,390 B2 | 2/2006 | Herley et al. | |
| 7,251,452 B2 | 7/2007 | Stumphauzer | |
| 8,225,206 B2 | 7/2012 | Faenger et al. | |
| 8,401,462 B2 | 3/2013 | Hellman | |
| 8,492,638 B2 * | 7/2013 | Faenger | G06N 5/02 455/154.1 |
| 8,843,316 B2 * | 9/2014 | Martin | H04W 4/185 701/487 |
| 9,495,447 B1 * | 11/2016 | Phillips | G06F 17/3074 |

(Continued)

FOREIGN PATENT DOCUMENTS

| | | |
|---|---|---|
| EP | 2030445 | 10/2013 |
| JP | 2004045890 | 2/2004 |

*Primary Examiner* — Jamie H Austin
(74) *Attorney, Agent, or Firm* — Dinsmore & Shohl LLP

(57) ABSTRACT

Systems and methods for providing broadcast data analysis. One embodiment of a method includes receiving broadcast related data for a discrete content segment from a plurality of vehicles at a plurality of different geographic locations, where the plurality of vehicles receives the discrete content segment at the respective geographic locations. Similarly, the method may include determining whether any of the broadcast related data may be filtered due to overlap of the plurality of different geographic locations, calculating a statistic based on the broadcast related data from the plurality of vehicles and providing information related to the content, based on a comparison of the discrete content segment and other discrete content segments.

20 Claims, 5 Drawing Sheets

(56) References Cited

U.S. PATENT DOCUMENTS

| | | | |
|---|---|---|---|
| 2003/0032399 A1* | 2/2003 | Slupe | H03J 1/0058 |
| | | | 455/161.2 |
| 2003/0194977 A1 | 10/2003 | Videtich et al. | |
| 2008/0156173 A1 | 7/2008 | Bauer | |
| 2009/0023406 A1 | 1/2009 | Ellis et al. | |
| 2010/0131642 A1* | 5/2010 | Chalikouras | G06Q 30/02 |
| | | | 709/224 |
| 2011/0178996 A1* | 7/2011 | Pendlebury | G06F 11/1453 |
| | | | 707/692 |
| 2013/0287212 A1 | 10/2013 | Marko et al. | |

* cited by examiner

SYSTEMS AND METHODS FOR PROVIDING BROADCAST DATA ANALYSIS

TECHNICAL FIELD

Embodiments described herein generally relate to systems and methods for providing broadcast data analysis and, more specifically, to embodiments for collecting broadcast data for subsequent use.

BACKGROUND

Music consumers and other content consumers now desire the ability to receive custom content with limited commercial interruption. While Pandora™, iHeart Radio™, etc. may provide the ability to play content within limited commercials and some customization, current solutions cannot combine broadcast content with user specific playlists.

Accordingly, a need exists for the ability to compile data regarding content that is being broadcast across the country (and world) on a plurality of mediums and utilize this data for automatically providing statistical data, content playlists, and the like.

SUMMARY

Systems and methods for providing broadcast data analysis are described herein. One embodiment of a method includes receiving broadcast related data for a discrete content segment from a plurality of vehicles at a plurality of different geographic locations, where the plurality of vehicles receives the discrete content segment at the respective geographic locations. Similarly, the method may include determining whether any of the broadcast related data may be filtered due to overlap of the plurality of different geographic locations, calculating a statistic based on the broadcast related data from the plurality of vehicles, and providing information related to the statistic, based on a comparison of the discrete content segment and other discrete content segments.

In another embodiment, a system for providing broadcast data analysis includes a first antenna for receiving a broadcast signal, the broadcast signal including content, a first tuner to tune to a plurality of different frequencies to receive the content on a plurality of different channels, and a vehicle computing device that includes a processor and a memory component. The memory component may store logic that, when executed by the processor, causes the system to determine an identity of the content, determine a location of the vehicle computing device at a time when the broadcast signal was received, and determine a timestamp when the broadcast signal was received. In some embodiments the logic further causes the system to provide the identity of the content, the location, and the timestamp to a remote computing device, where the remote computing device receives similar information from a plurality of different vehicle computing devices to determine popularity data of the content that is broadcast in a plurality of different geographic locations.

In yet another embodiment, a system for providing broadcast data analysis includes logic that causes the system to receive broadcast related data for a discrete content segment from a plurality of vehicles, where the plurality of vehicles receives the discrete content segment via an antenna and a tuner. In some embodiments, the logic causes the system to determine a location of the plurality of vehicles when the discrete content segment was received, calculate a first statistic based on the broadcast related data received from the plurality of vehicles and filtering out data from vehicles with overlapping geographic locations. In some embodiments, the logic causes the system to provide information related to the statistic, based on a comparison of the discrete content segment and other discrete content segments.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
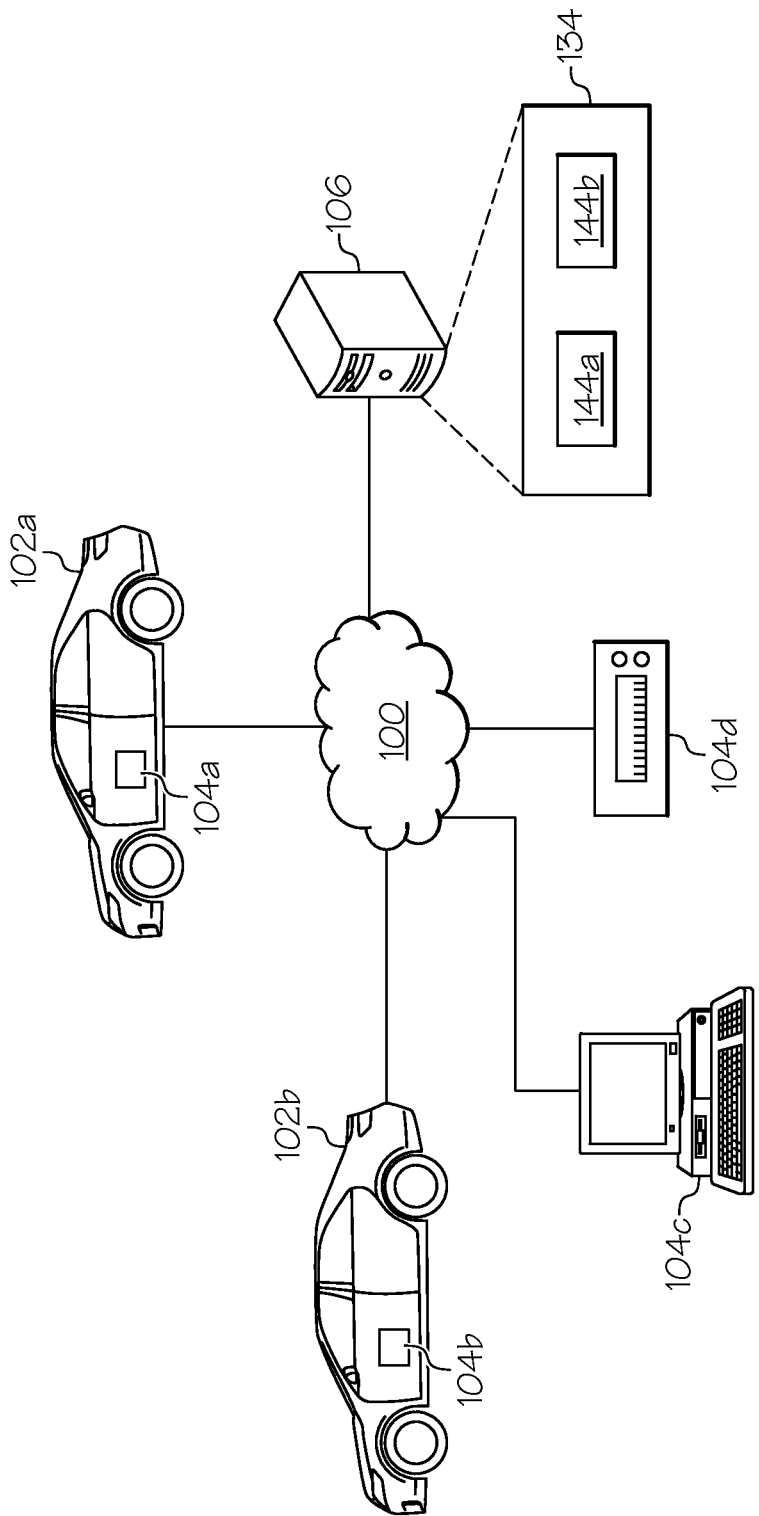
FIG. 1 schematically depicts a computing environment for providing broadcast data analysis, according to embodiments disclosed herein.

Embodiments disclosed herein include systems and methods for providing broadcast data analysis. Some embodiments include hardware and/or software to continuously collect and analyze broadcast data (e.g., AM/FM/HD radio, television signals, etc.) throughout a fleet of vehicles. As an example, an automobile manufacturer may have a vast distribution of radios throughout the world and can coordinate a global network of radio receivers to create a database of all broadcast music encountered by the vehicles. The system may leverage the data collected about the broadcasters with a timestamp and/or and geo-caching data tag to identify the most played content and provide users an on-demand playlist of songs from any given station, songs from a particular genre, songs from a particular geographic region, trending songs, frequently played songs, infrequently played songs, etc. to be viewed by a playlist viewer.

Accordingly, embodiments disclosed herein may provide a mechanism to create playlists from and/or otherwise provide content that was previously broadcast on AM, FM, satellite, etc. With crowd sourcing of broadcast data from the fleet of vehicles, the work of collecting broadcast data may be performed without user interaction. Analytics may also be provided.

Some of the vehicles may be equipped with a single tuner, while other vehicles may be equipped with a plurality of tuners. Single tuner probes may report the content that was received by that tuner and thus viewed by the user. Vehicles with a plurality of tuners may have a first tuner that is tuned to a user-defined frequency, while the second tuner, third tuner, etc. may scan a plurality of different channels, a plurality of different frequencies, and/or a plurality of different sources (e.g., iPod, mobile phone, compact disc, etc.) automatically and may collect information from those sources without the user viewing that content.

More specifically, multiple tuner vehicles (e.g., with two or more tuners) may utilize a first tuner and a second tuner, as well as logic to facilitate collection of data when the tuner is not in "radio mode" or otherwise in an advanced reception scheme (such as phase diversity). In such embodiments, the first tuner may be manually tuned to a station by a user. The second tuner may automatically scan frequencies to identify broadcast related data from at least one channel.

Additionally, for reliable metadata, embodiments may be configured to specifically identify only a predetermined content type metadata in the AM/FM/HD radio power spectral density (PSD) digital sideband by filtering out program type (PTY) genre codes. This significantly reduces the likelihood that undesirable stations or content (including a discrete content segment, such as a song, program, etc.) would affect quality of music (or other) data collected.

When transmitting data about a received song (or other content) to the database, embodiments may be configured to incorporate such information as time and location based on the received positioning data of the vehicle. Global coordinates and map data cross-referencing to cities may be performed by the vehicle (if equipped with a navigation system) and/or performed by a remote computing device or other computing device.

Depending on the embodiment, the handling of multiple transmissions of the same content on the same frequency within a given time frame and geo-fenced area may be given specific consideration as to not count duplicate songs for certain purposes (e.g., two cars on the highway tuned to 88.7 at 3:00 PM in Detroit only count once for overall play counts, but may be counted twice for other metrics, such as user preference). Similarly, some embodiments may be utilized to capture duplicative data to determine which content viewers are actually viewing.

Depending on the particular embodiment, playlists returned may be used as seed stations for internet based radio stations and/or may be used for actual content playback to a playlist viewer. Similarly, embodiments may be configured for implementation on a variety of deployment scales. Specifically, some embodiments may be limited to a single vehicle that only stores the data collected within its reception range. The system may be configured for collecting reception data during the time when the vehicle is on or could incorporate a time division multiplexing scheme with limited power operation to scan the FM spectrum when the vehicle is not in operation.

Referring now to the drawings, FIG. 1 schematically depicts a computing environment for broadcast data analysis, according to embodiments disclosed herein. As illustrated, a network 100 may be coupled to a vehicle 102, such as vehicles 102a, 102b. The vehicles 102a, 102b may include a computing device, such as vehicle computing devices 104a, 104b respectively. Additionally, the vehicles 102a, 102b may each include one or more radio receivers with one or more tuners for tuning to radio frequencies and thus for receiving broadcast content over such broadcast types as AM, FM, XM, HD Radio, etc. Accordingly, the vehicles 102a, 102b may include one or more antennas (such as a first antenna and a second antenna), speakers, a display device (such as display device 240 from FIG. 2), and/or other hardware for receiving and providing broadcast content. Also coupled to the network 100 are a user computing device 104c, a content receiving device 104d, and a remote computing device 106, which includes a memory component 134 that may store data compiling logic 144a and analysis logic 144b.

The network 100 may include a wide area network, such as the internet, a cellular network (such as 3G, 4G, 4G LTE, WiMax, etc.), a content broadcast network (such as AM, FM, satellite radio, television, etc.). Similarly, the network 100 may include a local area network, such as a wireless fidelity (WiFi) network, a Bluetooth network, a near field communication network, hardwire, etc.

The vehicle computing devices 104a, 104b may be configured as an integrated computing device and/or may be configured as a discrete computing device (such as a mobile phone) that is configured for receiving data from a respective vehicle 102 to provide the functionality described herein. Accordingly, the vehicle computing devices 104a, 104b may include a positioning system (such as a global positioning system), radio receiver, display device, and/or other components for providing the functionality described herein. In some embodiments, hardware and/or software for providing the described functionality may be included, but are separate from the vehicle computing device 104a, 104b.

Similarly, the user computing device 104c may be configured as a personal computer, laptop, mobile phone, a tablet, and/or other device for performing the functionality described herein. The user computing device 108 may be utilized for receiving and/or providing broadcast content, as well as playlists created as described herein. The content receiving device 104d may be configured for similar functionality, and may include at least one radio tuner, a television tuner, a computing device, and/or other hardware and software for receiving and providing the content described herein.

Also depicted in FIG. 1 is the remote computing device 106 that includes a memory component 134. The memory component 134 may store logic, such as data compiling logic 144a and analysis logic 144b. The data compiling logic 144a may be executed by a processor (such as processor 632 from FIG. 6) of the remote computing device 106 to cause the remote computing device 130 to detect receive a broadcast signal (such as radio signals and/or metadata) for determining the identity of the received content. The analysis logic 144b may cause the remote computing device 106 to utilize the received data to create playlists and/or determine statistics (such as a first statistic and a second statistic) related to the broadcast content. The statistics may include one or more of: most played content, most played content for a predetermined geographic location, most played content for a predetermined content type, content from a predetermined broadcast station, trending content, infrequently broadcast content, etc. Other components of the vehicle computing device 104a may be provided in FIG. 6, described in more detail, below.

Figure 2:
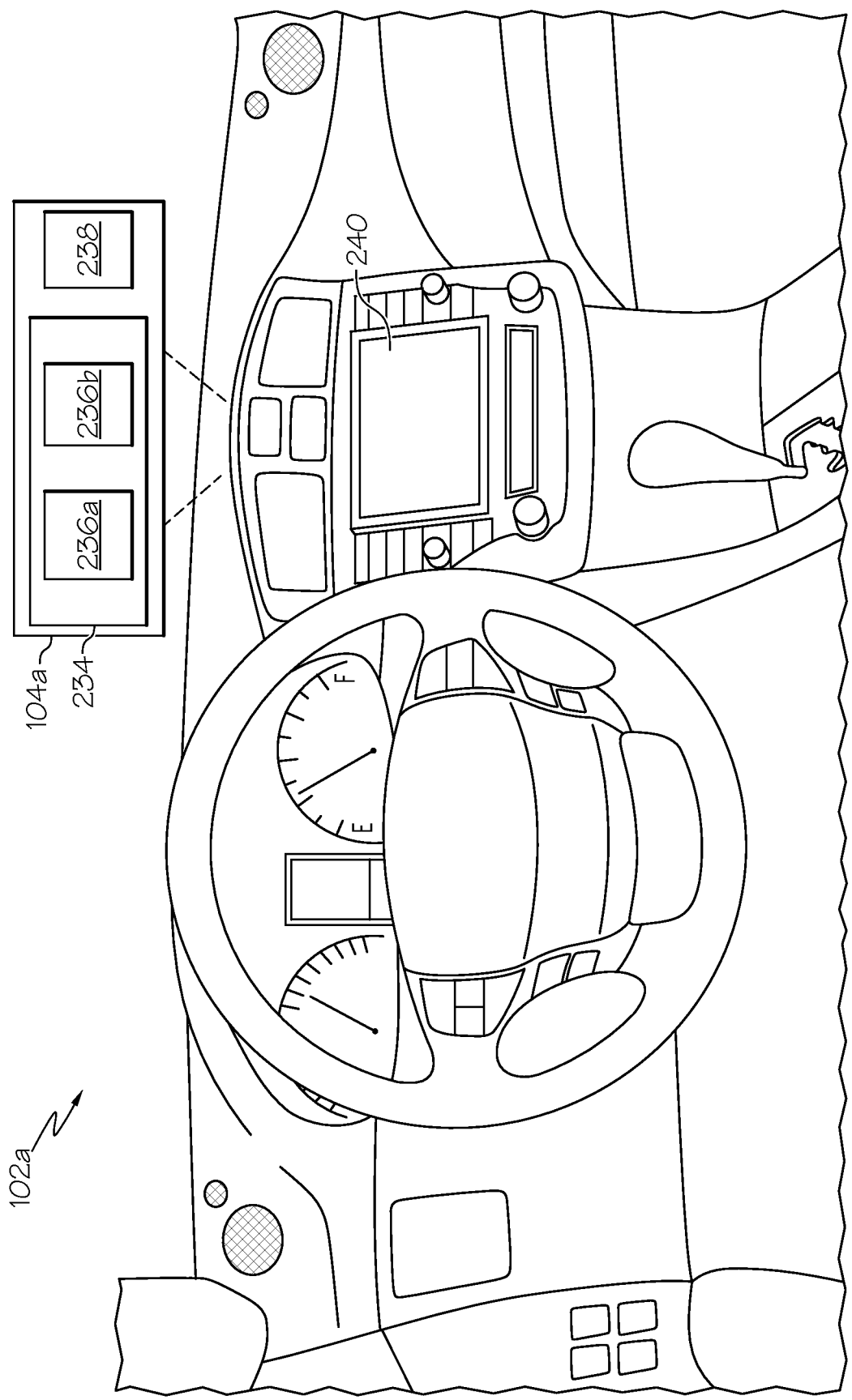
FIG. 2 schematically depicts a vehicle interior for providing broadcast data analysis, according to embodiments disclosed herein.

FIG. 2 schematically depicts a vehicle interior for providing broadcast data analysis, according to embodiments disclosed herein. As illustrated, the vehicle 102a includes the vehicle computing device 104a, which includes a memory component 234 that stores content determining logic 236a and communication logic 236b. The content determining logic 236a may be utilized to receive metadata and/or otherwise determine the identity and/or other information regarding received content. The communication logic 236b may be utilized for facilitating communication with the remote computing device 106. A processor 238 is also included for executing the logic. Also included is a display device 240 for providing one or more user interfaces related to receipt of content, playback of content, identification of content, and/or for other purposes described herein.

Accordingly, the vehicle 102*a* may receive broadcast content, such as a radio broadcast, television broadcast, etc. The vehicle computing device 104*a* may determine a timestamp and/or timestamp data for receiving the broadcast content, and may identify the broadcast content that was received (such as a song title, a program title, an episode title, an album title, etc.). The vehicle computing device 104*a* may additionally receive a geo-position of the vehicle 102 when the content was received. This information may be sent to the remote computing device 106. The remote computing device 106 may receive this data from the vehicle 102*a*, the vehicle 102*b*, and/or other vehicles with this functionality. The remote computing device 106 may utilize the received data to determine statistical information regarding broadcast content over one or more geographic locations.

As an example, the remote computing device 106 may utilize the received data to determine the content that is most played. Identifications regarding content type (such as rock, country, classical, talk, etc.) may be determined and determinations may be made with regard to these content types. The remote computing device 106 may additionally create playlists of the most heavily broadcast content and may provide this information for use in additional broadcasts and/or for playback using services such as Pandora™, iHeart Radio™, Spotify™, etc.

Similarly, some embodiments may be configured to determine the content that users are actually tuned to identify not only popularity of content (e.g., most played content) by the broadcasters, but popularity among users. This information may be utilized for similar purposes described above. Depending on the particular embodiment, this determination may be made by the vehicle computing device 104*a*. If the vehicle 102*a* only includes a single tuner, the vehicle computing device 104*a* may determine that the received data is being listened and/or viewed by the user. If the vehicle 102*a* includes a plurality of tuners, a determination may be made regarding which tuner is being actively utilized. Other tuners in the vehicle 102 may be utilized to scan channels for determining broadcast content that is not being played to the user. As the second (or other) tuners detect content, the vehicle computing device 104*a* may determine an identity of the content, a timestamp, a geo-location, etc. that may be sent to the remote computing device 106.

Figure 3:
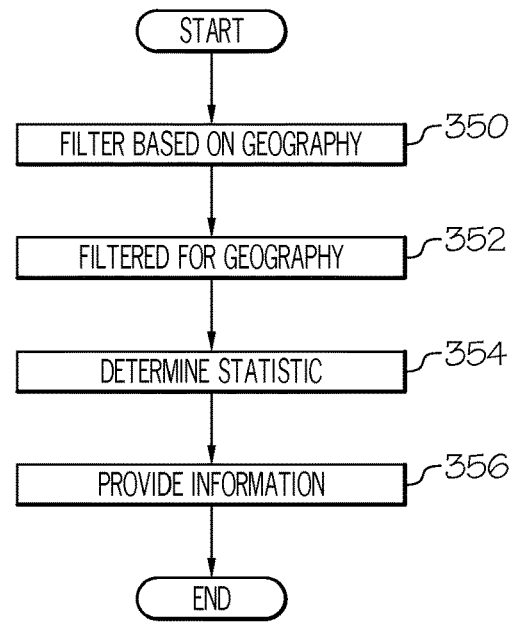
FIG. 3 depicts a flowchart providing content information, according to embodiments disclosed herein.

FIG. 3 depicts a flowchart providing content information, according to embodiments disclosed herein. As illustrated in block 350, broadcast data may be received from a plurality of vehicles. The broadcast data may include information identifying content that has been broadcast from one or more geographic locations, as well as other information described above. In block 352, a determination of the geographical locations of the vehicles that sent data to the remote computing device 106 may be made and data from vehicles with overlapping geographic locations may be filtered out.

The plurality of different geographic locations of the plurality of different vehicle computing devices 104 may be determined by the respective vehicle computing device 104*a* via from a positioning system and/or by determining a location of the broadcast system that is broadcasting the content (such as using audio detection functionality to determine the broadcast station and thus an approximate location of the vehicle). In block 354, the filtered broadcast data may be utilized to determine a statistic with regard to broadcast content. As described above, the statistic may be related to content that is most broadcast and/or viewed by users. In block 356, information related to the statistic may be provided. This may include providing one or more playlists to one or more users, providing the statistical data to a third party for advertising, broadcast, etc.

Figure 4:
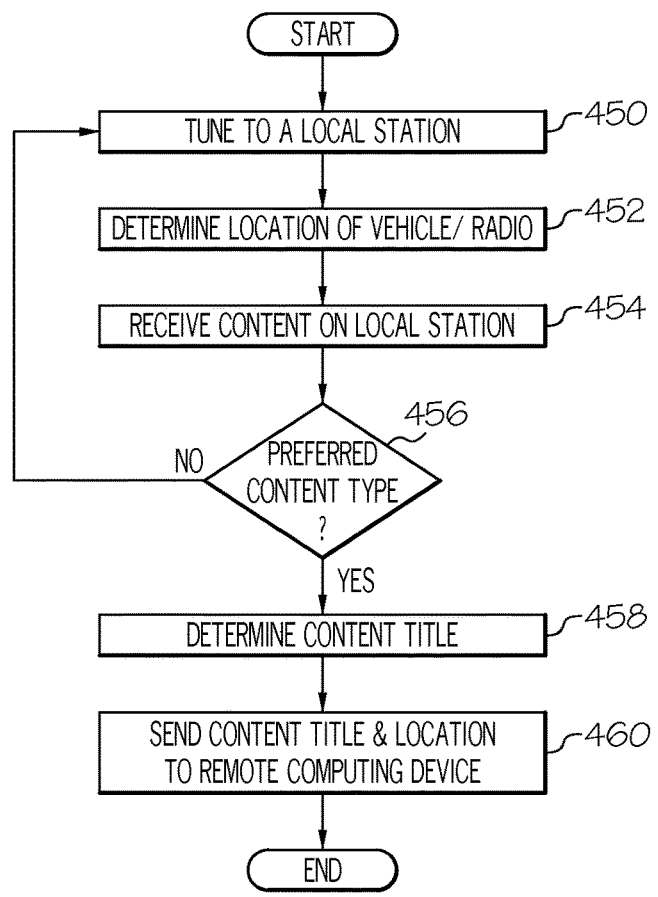
FIG. 4 depicts a flowchart for sending broadcast related data to a remote computing device, according to embodiments disclosed herein.

FIG. 4 depicts a flowchart for sending broadcast related data to a remote computing device 106, according to embodiments disclosed herein. As illustrated in block 450, a vehicle 102 may tune to a currently local station (e.g., a broadcast station that is local to a current location of the vehicle 102). In block 452, the location of the vehicle 102 and/or tuner may be determined. In block 454, content may be received from the local station. In block 456, a determination may be made regarding whether the received content is a preferred content type. In some embodiments, the preferred content type may be musical content and non-preferred content type may include talk radio. Similarly, some embodiments may identify rock music as a preferred content type and classical as non-preferred. Regardless of the actual classification of preferred content types, if the received content is not a preferred content type, the flowchart returns to block 450. If the received content is classified as the preferred content type, the flowchart may proceed to block 458 to determine the content title and/or other identifier. In block 460, the content title, location and/or other data may be sent to the remote computing device 106 for utilization described above.

Figure 5:
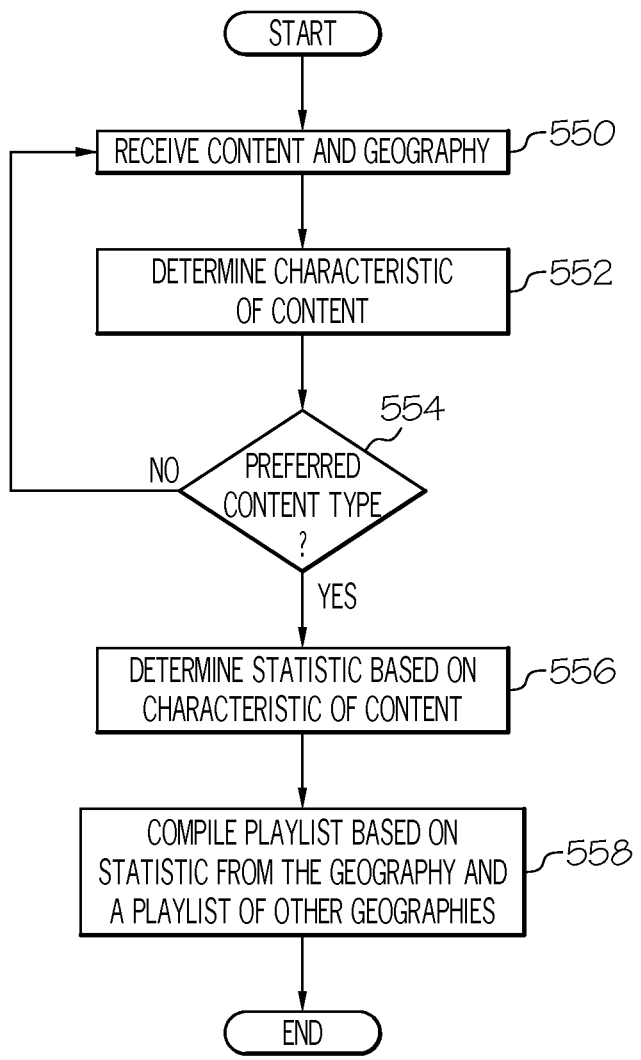
FIG. 5 depicts a flowchart for compiling a playlist based on statistical data, according to embodiments disclosed herein.

FIG. 5 depicts a flowchart for compiling a playlist based on statistical data, according to embodiments disclosed herein. As illustrated in block 550, content and geographical information may be received. In block 552, a characteristic of the content may be determined. The characteristic may include a content type and/or other characteristic. In block 554, a determination may be made regarding whether the received content is the preferred content type. In block 556, a statistic may be determined based on the characteristic of the content. In block 558, a playlist may be compiled based on the static from the geographical location and a plurality of other geographical locations. The playlist may be sent to a content provider and/or provided to one or more users.

Figure 6:
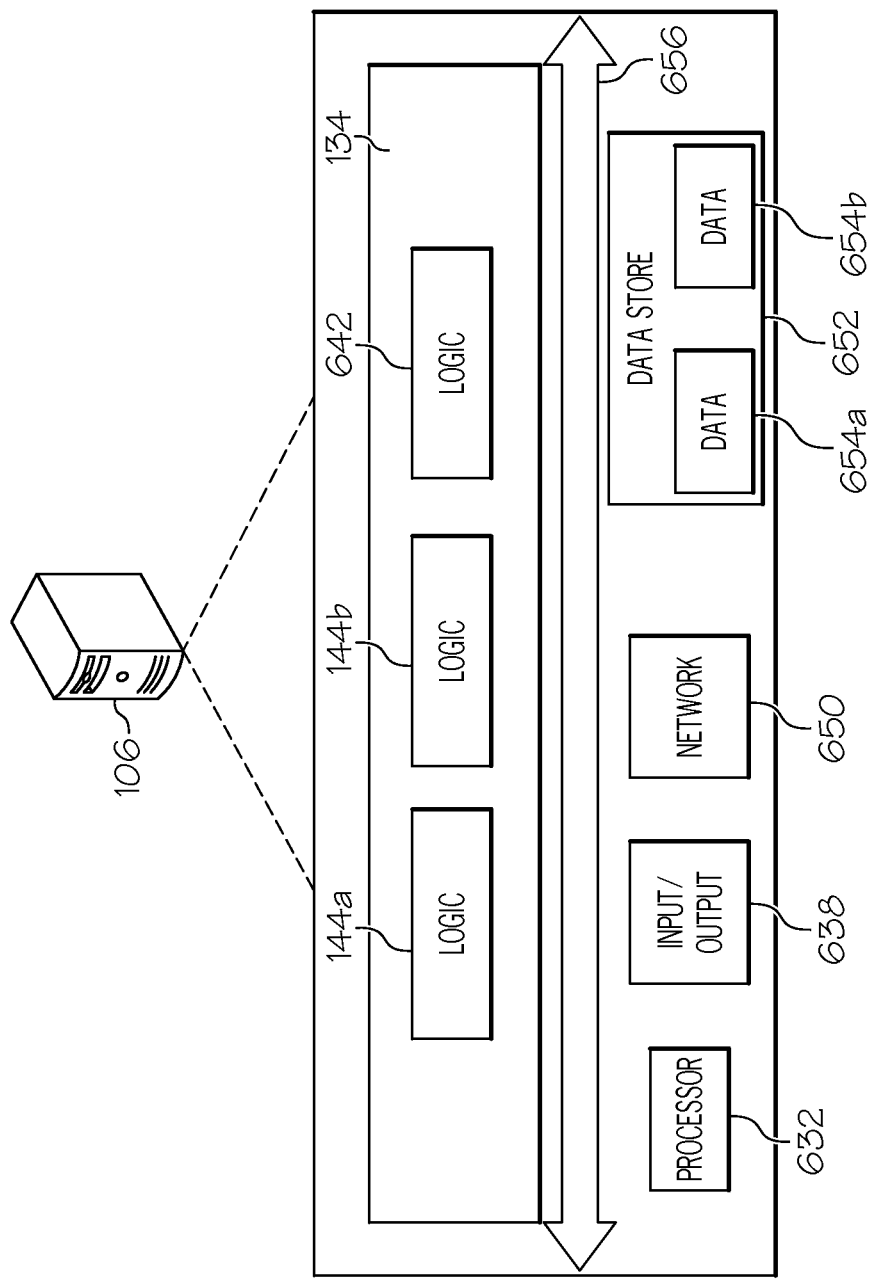
FIG. 6 depicts a computing device for providing broadcast data analysis, according to embodiments disclosed herein.

FIG. 6 depicts a remote computing device 106 for providing broadcast data analysis, according to embodiments disclosed herein. The remote computing device 106 includes a processor 632, input/output hardware 638, network interface hardware 650, a data storage component 652 (which stores location data 654*a*, content data 654*b*, and/or other data), and the memory component 134. The memory component 134 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 106 and/or external to the remote computing device 106.

The memory component 140 may store operating logic 642, the data compiling logic 144*a* and the analysis logic 144*b*. The data compiling logic 144*a* and the analysis logic 144*b* may each include a plurality of different pieces of logic, each of which may be embodied as a computer program, firmware, and/or hardware, as an example. A local interface 656 is also included in FIG. 6 and may be implemented as a bus or other communication interface to facilitate communication among the components of the remote computing device 106.

The processor 632 may include any processing component operable to receive and execute instructions (such as from a data storage component 652 and/or the memory component 134). As described above, the input/output hardware 638 may include and/or be configured to interface with the components of FIG. 6.

The network interface hardware 650 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the remote computing device 106 and other computing devices, such as those depicted in FIG. 1.

The operating logic 642 may include an operating system and/or other software for managing components of the remote computing device 106. As discussed above, the data compiling logic 144a may reside in the memory component 134 and may be configured to cause the processor 632 to compile information from a plurality of vehicles and/or content display devices (such as radios, televisions, computing devices, etc.). Similarly, the analysis logic 144b may be utilized to analyze the information related to the content to determine statistics, arrange playlists, etc.

It should be understood that while the components in FIG. 6 are illustrated as residing within the remote computing device 106, this is merely an example. In some embodiments, one or more of the components may reside external to the remote computing device 106. It should also be understood that, while the remote computing device 106 is illustrated as a single device, this is also merely an example. In some embodiments, the data compiling logic 144a and the analysis logic 144b may reside on different computing devices. As an example, one or more of the functionalities and/or components described herein may be provided by the vehicle computing devices 104a, 104b, the user computing device 104c and/or the content receiving device 104d, which may be coupled to the vehicle 102 via the network 100. These computing devices may also include hardware and/or software for performing the functionality described herein.

Additionally, while the remote computing device 106 is illustrated with the data compiling logic 144a and the analysis logic 144b as separate logical components, this is also an example. In some embodiments, a single piece of logic may cause the vehicle computing device 104a to provide the described functionality.

As illustrated above, various embodiments of providing broadcast data analysis are disclosed. These embodiments allow for crowd sourcing data compilation of broadcast content. Specifically, a plurality of radio and/or television receivers may receive the broadcast data, determine an identity of the broadcast data, a location, and/or other information for data analysis, playlist compilation, etc.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for broadcast data analysis. It should also be understood that these embodiments are merely exemplary and are not intended to limit the scope of this disclosure.

What is claimed is:

1. A system for providing broadcast data analysis comprising:
   a first antenna for receiving a broadcast signal, the broadcast signal including content;
   a first tuner to tune to a plurality of different frequencies and to receive the content on at least one of the plurality of different frequencies; and
   a vehicle computing device that includes a processor and a memory component, the memory component storing logic that, when executed by the processor, causes the system to perform at least the following:
   determine an identity of the content;
   determine a location of the vehicle computing device when the broadcast signal was received by the first tuner;
   determine a timestamp when the broadcast signal was received by the first tuner;
   determine whether the content is a preferred content type for a remote computing device to determine popularity data associated with popularity by broadcasters broadcasting the content;
   in response to determining that the content is not the preferred content type, receive different content; and
   in response to determining that the content is the preferred content type, provide the identity of the content, the location, and the timestamp to the remote computing device, wherein the remote computing device receives similar information from a plurality of different vehicle computing devices, determines duplicative content from at least two of the plurality of different vehicle computing devices, filters out the duplicative content, and determines the popularity data associated with popularity of the content to broadcasters that is broadcast in a plurality of different geographic locations.

2. The system of claim 1, further comprising a second antenna and a second tuner, wherein the first tuner is manually tuned to a channel by a user and wherein the second tuner automatically scans the plurality of different frequencies and collects metadata, location data, and timestamp data for the content that is broadcast on the plurality of different frequencies for sending to the remote computing device.

3. The system of claim 2, further comprising a positioning system to determine the location of the vehicle computing device when the content was received by the first tuner.

4. The system of claim 1, wherein determining the location of the vehicle computing device further includes determining a content providing station that broadcasts the content and determining a location of the content providing station.

5. The system of claim 1, wherein the logic further causes the system to receive data related to a playlist, wherein at least a portion of the playlist is compiled from information sent by the vehicle computing device to the remote computing device.

6. The system of claim 1, wherein the broadcast signal includes metadata and wherein determining the identity of the content comprises analyzing the metadata to determine the identity of the content.

7. The system of claim 1, wherein determining the identity of the content comprises analyzing a characteristic of the content and comparing the characteristic to data in a data storage component.

8. A method for providing broadcast data analysis comprising:
- determining, by a vehicle computing device, an identity of content received by an antenna of a vehicle;
- determining, by the vehicle computing device, a location of the vehicle when the broadcast signal was received;
- determining, by the vehicle computing device, a timestamp when the broadcast signal was received;
- determining, by the vehicle computing device, whether the content is a preferred content type for a remote computing device to determine popularity data associated with popularity by broadcasters broadcasting the content;
- in response to determining that the content is not the preferred content type, receiving, by the vehicle computing device, different content; and
- in response to determining that the content is the preferred content type, providing, by the vehicle computing device, the identity of the content, the location and the timestamp to a remote computing device, wherein the remote computing device receives similar information from a plurality of different vehicle computing devices, determines duplicative content from at least two of the plurality of different vehicle computing devices, filters out the duplicative content, and determines the popularity data associated with popularity of the content to broadcasters that is broadcast in a plurality of different geographic locations.

9. The method of claim 8, further comprising:
- receiving user input to manually tune to a channel via a first tuner;
- automatically scanning a plurality of different frequencies via a second tuner; and
- collecting metadata, location data, and timestamp data for the content that is broadcast on the plurality of different frequencies for sending to a remote computing device.

10. The method of claim 9, further comprising determining the location of the vehicle computing device when the content was received.

11. The method of claim 8, wherein determining the location of the vehicle further includes determining a content providing station that broadcasts the content and determining a location of the content providing station.

12. The method of claim 8, further comprising receiving data related to a playlist, wherein at least a portion of the playlist is compiled from information sent by the vehicle computing device to a remote computing device.

13. The method of claim 8, wherein the broadcast signal includes metadata and wherein determining the identity of the content comprises analyzing the metadata to determine the identity of the content.

14. The method of claim 8, wherein determining the identity of the content comprises analyzing a characteristic of the content and comparing the characteristic to data in a data storage component.

15. A non-transitory computer-readable medium for providing broadcast data analysis that is stores logic, that when executed by a vehicle computing device, performs at least the following:
- determine an identity of content received by an antenna of a vehicle;
- determine a location of the vehicle when the broadcast signal was received;
- determine a timestamp when the broadcast signal was received;
- determine whether the content is a preferred content type for a remote computing device to determine popularity data associated with popularity by broadcasters broadcasting the content;
- in response to determining that the content is not the preferred content type, receive different content; and
- in response to determining that the content is the preferred content type, provide the identity of the content, the location and the timestamp to a remote computing device, wherein the remote computing device receives similar information from a plurality of different vehicle computing devices, determines duplicative content from at least two of the plurality of different vehicle computing devices, filters out the duplicative content, and determines the popularity data associated with popularity of the content to broadcasters that is broadcast in a plurality of different geographic locations.

16. The non-transitory computer-readable medium of claim 15, wherein the logic further causes the vehicle computing device to perform at least the following:
- automatically scan a plurality of different frequencies; and
- collect metadata, location data, and timestamp data for the content that is broadcast on the plurality of different frequencies for sending to a remote computing device.

17. The non-transitory computer-readable medium of claim 15, wherein determining the location of the vehicle further includes determining a content providing station that broadcasts the content and determining a location of the content providing station.

18. The non-transitory computer-readable medium of claim 15, wherein the logic further causes the vehicle computing device to receive data related to a playlist, wherein at least a portion of the playlist is compiled from information sent by the vehicle computing device to the remote computing device.

19. The non-transitory computer-readable medium of claim 15, wherein the broadcast signal includes metadata and wherein determining the identity of the content includes analyzing the metadata to determine the identity of the content.

20. The non-transitory computer-readable medium of claim 15, wherein determining the identity of the content includes analyzing a characteristic of the content and comparing the characteristic to data in a data storage component.

* * * * *